United States Patent [19]

Wackerle et al.

[11] 4,255,087
[45] Mar. 10, 1981

[54] MEMBER FORMED OF FIBER-REINFORCED PLASTIC MATERIAL, SUCH AS A ROTOR BLADE

[75] Inventors: Peter M. Wackerle, Ottobrunn; Klaus Brunsch, Weidach; Josef Gröber, Munich, all of Fed. Rep. of Germany

[73] Assignee: Messerschmitt-Bolkow-Blohm GmbH, Munich, Fed. Rep. of Germany

[21] Appl. No.: 45,845

[22] Filed: Jun. 5, 1979

[30] Foreign Application Priority Data

Jun. 19, 1978 [DE] Fed. Rep. of Germany ....... 2826656

[51] Int. Cl.³ .............................................. B64C 27/46
[52] U.S. Cl. ................................ 416/230; 416/134 A; 416/141
[58] Field of Search .......... 416/134 A, 230 R, 230 A, 416/226, 241 A, 229

[56] References Cited

U.S. PATENT DOCUMENTS

| 3,476,484 | 11/1969 | Brunsch | 416/230 A |
| 3,950,115 | 4/1976 | Euler | 416/226 |
| 4,038,885 | 8/1977 | Jonda | 416/134 A X |

FOREIGN PATENT DOCUMENTS

| 1276356 | 6/1972 | United Kingdom | 416/230 |
| 2025339 | 1/1980 | United Kingdom | 416/241 A |

*Primary Examiner*—Everette A. Powell, Jr.
*Attorney, Agent, or Firm*—Toren, McGeady and Stanger

[57] ABSTRACT

A rotor blade formed of a fiber-reinforced plastic material is constructed for the absorption of at least one of longitudinal forces and bending forces. The interior of the blade is formed of an elongated bundle of fiber strands forming a loop intermediate its ends. The loop defines one end of the longitudinally extending blade. The bundle has two limb portions extending from the loop and forming, adjacent the loop, a transition portion followed by a neck portion and then a blade portion. A skin encloses the blade outwardly from the loop. A layer of fiber strands extends around the outer surface of the loop and between the skin and the limb portions at least in the transition portion. In the region of the loop the fiber strands extend in parallel relation with the fiber strands in the bundle, however, in the transition portion the fiber strands in the layer extend angularly across the longitudinal axis of the blade.

4 Claims, 3 Drawing Figures

MEMBER FORMED OF FIBER-REINFORCED PLASTIC MATERIAL, SUCH AS A ROTOR BLADE

SUMMARY OF THE INVENTION

The present invention is directed to a member formed of fiber-reinforced plastic material and arranged to absorb at least one of longitudinal forces and bending forces. The member is formed interiorly by a bundle of fiber strands defining a loop intermediate the ends of the bundle with the loop forming one end of the member. The bundle has two limb portions extending from the loop forming a transition portion adjacent the loop followed by a neck portion and the remainder of the member. A fiber-reinforced skin encloses the member outwardly from the loop starting at the transition section. The limb portions are enclosed by a fiber-reinforced skin in which the fibers extend across the longitudinal axis of the member.

It is well known that a member such as a rotor blade can be connected to a rotor hub without flapping and lag hinges and, thus, compared to a rotor with such hinges, it results in a simpler design and lower weight for the rotor head. This is particularly true since long and heavy blade root sleeves (blade fittings) are avoided because the fiber strands forming the blade are combined in a bundle which forms a loop in the blade root region. In such a structural component, however, the different orientation of the fibers in the bundle on one hand and in the blade skin on the other, result in different moduli of shear. As a result, particularly under bending load along with a simultaneous torsion load, high shearing stress concentrations may occur between separate portions of the bundle extending from the loop and the blade skin in the transition region between the loop and the blade neck, that is at the base of the loop where the blade skin ends. The fiber strands in the limbs of the bundle have a low shear modulus while the fibers in the blade skin have a high shear modulus. These different loads acting simultaneously may lead to so-called shearing cracks (fiber cracks) in the blade skin resulting in a drastic change in the shear resistance of the rotor blade and in a change in the inherent frequency of the blade or in unduly high vibrations in the rotor.

Therefore, the primary object of the present invention is to provide a blade structure which is better able to accommodate the load conditions resulting from the combination of bending loads and torsion loads.

In accordance with the present invention, a layer of fiber strands is provided between the fiber-reinforced skin on the blade and the limb portions of the bundle of fiber strands forming at least the transition portion extending between the loop and the neck portion. The layer of fiber strands forms an outer layer over the loop with the strands extending parallel with the fibers in the loop. In the transition section, however, the fiber strands extend angularly across the longitudinal axis of the blade. The angular relation of the fiber strands to the longitudinal axis varies with regard to the distance between the strands and the longitudinal axis at the location of the end of the loop adjacent the transition section.

In the transition portion of the blade between the limb portions of the bundle of fiber strands and the blade skin adjacent the loop, the shearing stresses are especially critical and the intermediate layer of fiber strands between the limb portions and the skin afford a continuous transition from the orientation of the fibers in the loop to the orientation of the fibers in the neck portion of the blade. Due to the different elastic properties of the limb portions and the blade skin, shearing stresses, particularly peak shearing stresses, which occur in this critical region are reduced or the shearing stress concentrations are avoided altogether. Accordingly, the strength of the blade structure is significantly increased. Further, in an especially simple manner, by adjusting the angular relation of the fiber strands in the intermediate layer between the limb portions and the blade skin, it is possible to improve the force distribution in the blade. Moreover, a preferred fiber orientation of the blade skin is in the range of 45° relative to the longitudinal axis of the blade.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
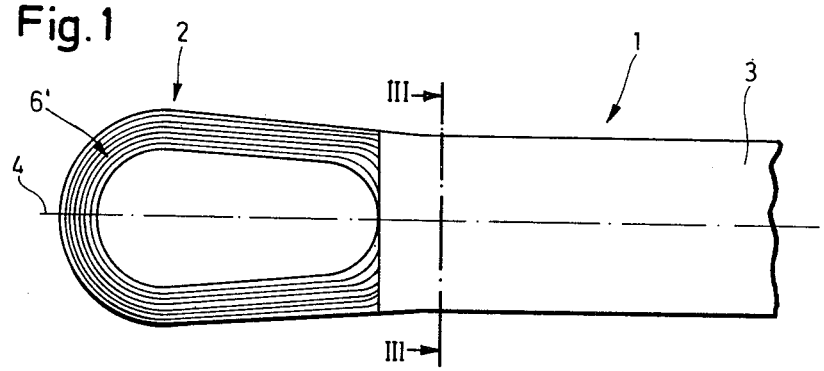
FIG. 1 is a top view of an end portion of a rotor blade illustrating only the blade root including a blade connection loop and the adjacent blade neck.
Figure 2:
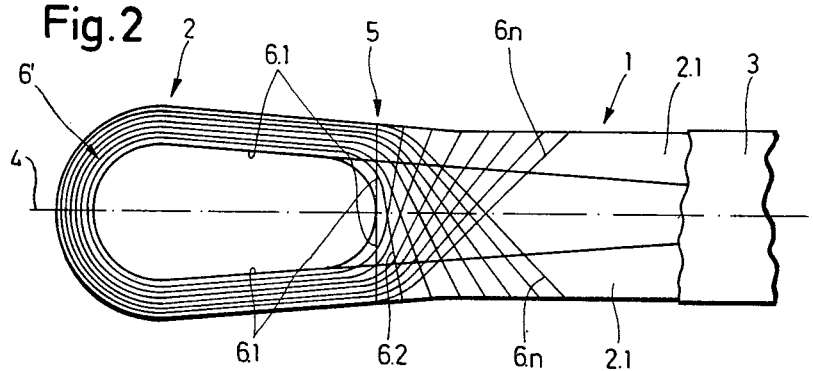
FIG. 2 is a top view of the portion of the rotor blade shown in FIG. 1 with the blade skin partially broken away.

In FIGS. 1 and 2 the connection end portion of a rotor blade is illustrated including a blade neck 1 which is connected to a blade wing section, not shown. The blade neck is constructed so that it is elastic in respect to bending in the directions of flapping and impact. Accordingly, the blade neck consists of fiber rovings, for instance glass fiber rovings or fiber strands which extend in the longitudinal direction of the blade, note the longitudinal axis 4, in a matrix of artificial resin. For the blade connection, the fiber strands are part of an elongated bundle forming a loop 2 intermediate its ends with two limb portions 2.1 extending from the loop in the longitudinal direction of the blade. Commencing from the end of the loop 2 adjacent the blade neck 1, a fiber reinforced blade skin 3 covers the blade except the loop portion. The blade skin 3 is formed of a fiber fabric impregnated with artificial resin with the fibers extending across the longitudinal axis 4 of the blade at an angle of approximately 45°. As is well known, such an angular arrangement of the fibers affords both high shearing strength and a high shear modulus. The significantly higher shear modulus of the blade skin 3 relative to the modulus of the two limb portions 2.1 which have unidirectional fibers, inevitably results in problems because the shearing stresses resulting from bending loads and torsional loads are superimposed in the transition region 5 between the loop 2 and the neck portion 1. To eliminate the stress concentrations between the limb portions 2.1 and the blade skin 3, in the region of the transition section where such stress concentrations are particularly dangerous, a layer of fiber strands 6.1 to 6.n, disposed in a matrix of artificial resin, is placed between the limb portions 2.1 and the blade skin at least in the transition section 5 on both sides of the loop 2. The fiber strands 6.1 to 6.n, which are illustrated only individually, also provide a cover layer 6' over the loop 2 with the fiber strands in the layer 6' extending parallel with the fiber strands forming the loop. In the transition section 5 the fiber strands 6.1 to 6.n on each blade side form an intermediate layer 6 between the limb portions 2.1 and the blade skin 3. The fiber strands in this transition section has a different orientation relative to the fiber strands in the limb portions and to the fibers in the skin so that a continuous transition is provided relative to the orientation of the fibers in the skin. More specifically, the fiber strands 6.1 to 6.n of each intermediate layer 6 are angularly oriented relative to the longitudinal axis of the blade based on the distance of the individual strand relative to the longitudinal axis. As can be seen in FIG. 2, the stands 6.1 closer to the longitudinal axis are bent at an angle of 90° relative to the longitudinal axis of the blade 4 while the fiber strands 6.n most remote from the longitudinal axis are bent at an angle of about 45° to it. As a result of this change in the orientation of the fiber strands 6.1 to 6.n from outer layer 6' of the loop 2 to the intermediate layer 6 between the limb portions 2.1 and the blade skin, the intermediate layer 6 provides a reinforcing layer with a stiffness characteristic changing continuously in the longitudinal direction of the blade while taking into account the different elastic properties of the limb portions and the blade skin. In view of the transverse contraction occurring under tensile load in the loop 2, the intermediate layers 6 afford a reinforcement of the terminating edge of the blade skin 3 adjacent the loop, because of the 90° angle of the fiber strands 6.1. The uniform angular change in the positions of the fiber strands 6.2 to 6.n in the longitudinal direction of the blade away from the loop and the resulting change in the modulus of shear from the limb portions 2.1 to the blade skin 3 has the effect that a load is uniformly introduced into the blade skin.

Figure 3:
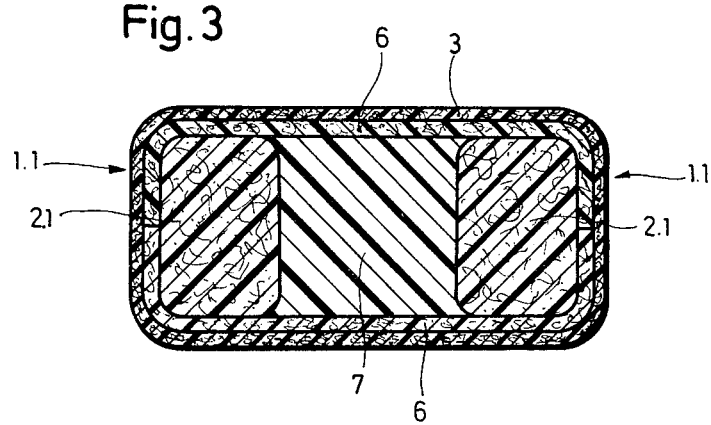
FIG. 3 is a sectional view taken along the line III—III in FIG. 1.

It should be noted in FIG. 3, that the part 7 forms a filling core located between the limb portions 2.1 forming the blade and does not contribute to the present invention. The same is true that the ends of the fiber strands 6.1 to 6.n extending perpendicularly along the narrow sides 1.1 of the blade neck 1 do not contribute to the inventive concept.

While specific embodiments of the invention have been shown and described in detail to illustrate the application of the inventive principles, it will be understood that the invention may be embodied otherwise without departing from such principles.

What is claimed is:

1. A member formed of fiber-reinforced plastic material, such as a rotor blade, and arranged for the absorption of at least one of longitudinal forces and bending forces, comprising a longitudinally extending member having a longitudinal axis with a loop at one end of said member, an elongated section extending from said loop in the direction of the longitudinal axis, said section including a neck portion and a transition portion interconnecting said loop and said neck portion, said longitudinally extending member comprising an elongated bundle of fiber strands forming said loop intermediate the ends of said bundle and having two limb portions thereof each extending from said loop alongside the other, said limb portions forming said transition portion and neck portion, a fiber reinforced skin enclosing said elongated section from said transition portion, the fibers in said skin extending across the longitudinal axis of said member, wherein the improvement comprises at least one layer of fiber strands located between said limb portion and said skin in said transition portion from said loop to said neck portion, said layer of fiber strands extending from said transition portion around and forming an outer layer on said loop with said fiber strands in said outer layer extending in parallel with the fiber strands in said bundle which forms said loop, and in the region of said transition portion where said layer is located between said limb portions of said bundle and said skin said fiber strands forming said layer extend angularly across the longitudinal axis of said member with the angle of each said strand being different relative to the longitudinal axis.

2. A member, as set forth in claim 1, wherein the angle of each said strand in said layer of fiber strands varies in accordance with the distance of each said strand from said longitudinal axis at the location of the end of said loop adjacent said transition portion with the one of said fiber strands closest to said longitudinal axis having the largest angle and the one of said fiber strands most remote from said longitudinal axis having the smallest angle.

3. A member, as set forth in claims 1 or 2, wherein said fibers in said skin extend across the longitudinal axis at an angle of approximately 45°, and said strands in said layers closest to the longitudinal axis at the end of said loop adjacent said transition portion extend at an angle of approximately 90° to the longitudinal axis and said strands in said layer most remote from the longitudinal axis at the end of said loop adjacent said transition portion extend at an angle of approximately 45° to the longitudinal axis.

4. A member, as set forth in claim 3, wherein each of the strands between said strand closest to the longitudinal axis and said strand most remote from the longitudinal axis have an angle in the range of 90° to 45° in accordance with the spacing of the strand from the longitudinal axis.

* * * * *